US006876975B1

(12) United States Patent
Zimmerman et al.

(10) Patent No.: US 6,876,975 B1
(45) Date of Patent: Apr. 5, 2005

(54) SYSTEM AND METHOD FOR HANDLING ALTERNATE INFORMATION ON ELECTRONIC PRICE LABELS

(75) Inventors: Terry L. Zimmerman, Lawrenceville, GA (US); Raghurama Bhyravabhotla, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 531 days.

(21) Appl. No.: 09/651,019

(22) Filed: Aug. 30, 2000

(51) Int. Cl.[7] ............................................. G06F 17/60
(52) U.S. Cl. ...................................................... 705/20
(58) Field of Search .......................................... 705/20

(56) References Cited

U.S. PATENT DOCUMENTS

| | | | | |
|---|---|---|---|---|
| 5,999,913 A | * | 12/1999 | Goodwin, III | 705/20 |
| 6,021,395 A | * | 2/2000 | Goodwin, III | 705/20 |
| 6,047,263 A | * | 4/2000 | Goodwin, III | 705/20 |
| 6,173,268 B1 | * | 1/2001 | Goodwin, III | 705/20 |
| 6,243,690 B1 | * | 6/2001 | Adamec et al. | 705/20 |
| 6,290,128 B2 | * | 9/2001 | Goodwin, III | 235/383 |
| 6,301,565 B1 | * | 10/2001 | Goodwin, III | 705/20 |
| 6,317,724 B1 | * | 11/2001 | Goodwin, III et al. | 705/20 |

FOREIGN PATENT DOCUMENTS

EP          0 837 439 A2   * 10/1997

OTHER PUBLICATIONS

"Retail Electronic Shelf Labels", available online at [www.visibletech-knowledgy.com/products/labels/labels.html], 2000.*

* cited by examiner

Primary Examiner—James S. McClellan
(74) Attorney, Agent, or Firm—Priest & Goldstein PLLC

(57) ABSTRACT

Systems and methods are disclosed for handling alternate information on electronic price labels. The system uses a price look-up file reader to determine the presence or absence of alternate data in a price look-up file. If alternate data are present for a merchandise item, the price look-up file reader generates an alternate message to be displayed by the electronic price label, in lieu of the item's unit price. The system includes a computer which maintains a first data file containing item identifiers for items associated with electronic price labels, and which determines the presence or absence, in such first data file, of alternate data, to be displayed by an electronic price label in lieu of an item's unit price. If alternate data are present, the system transmits messages to the electronic price labels containing the alternate messages and a command to display the alternate messages in lieu of unit price information.

17 Claims, 4 Drawing Sheets

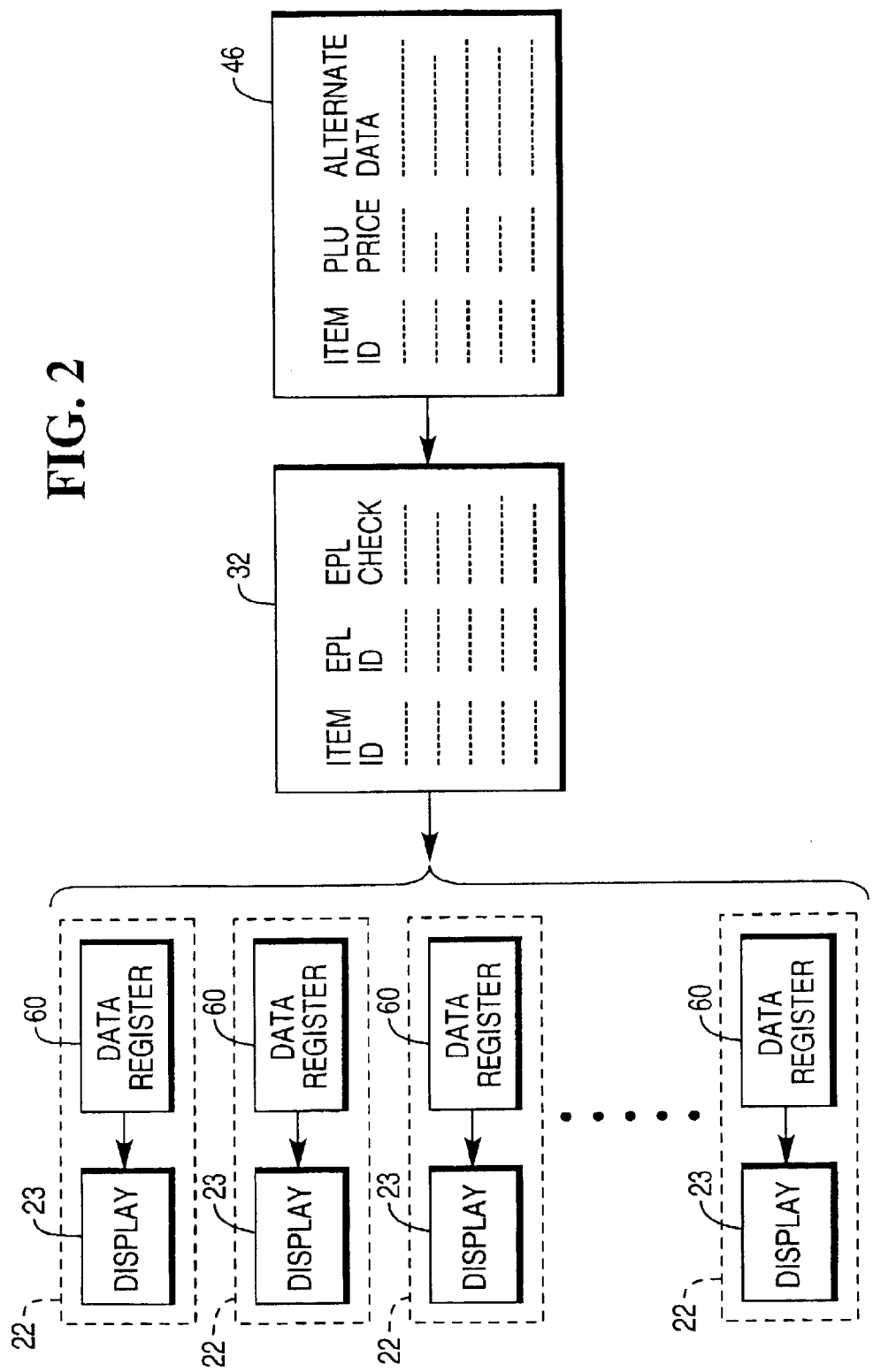

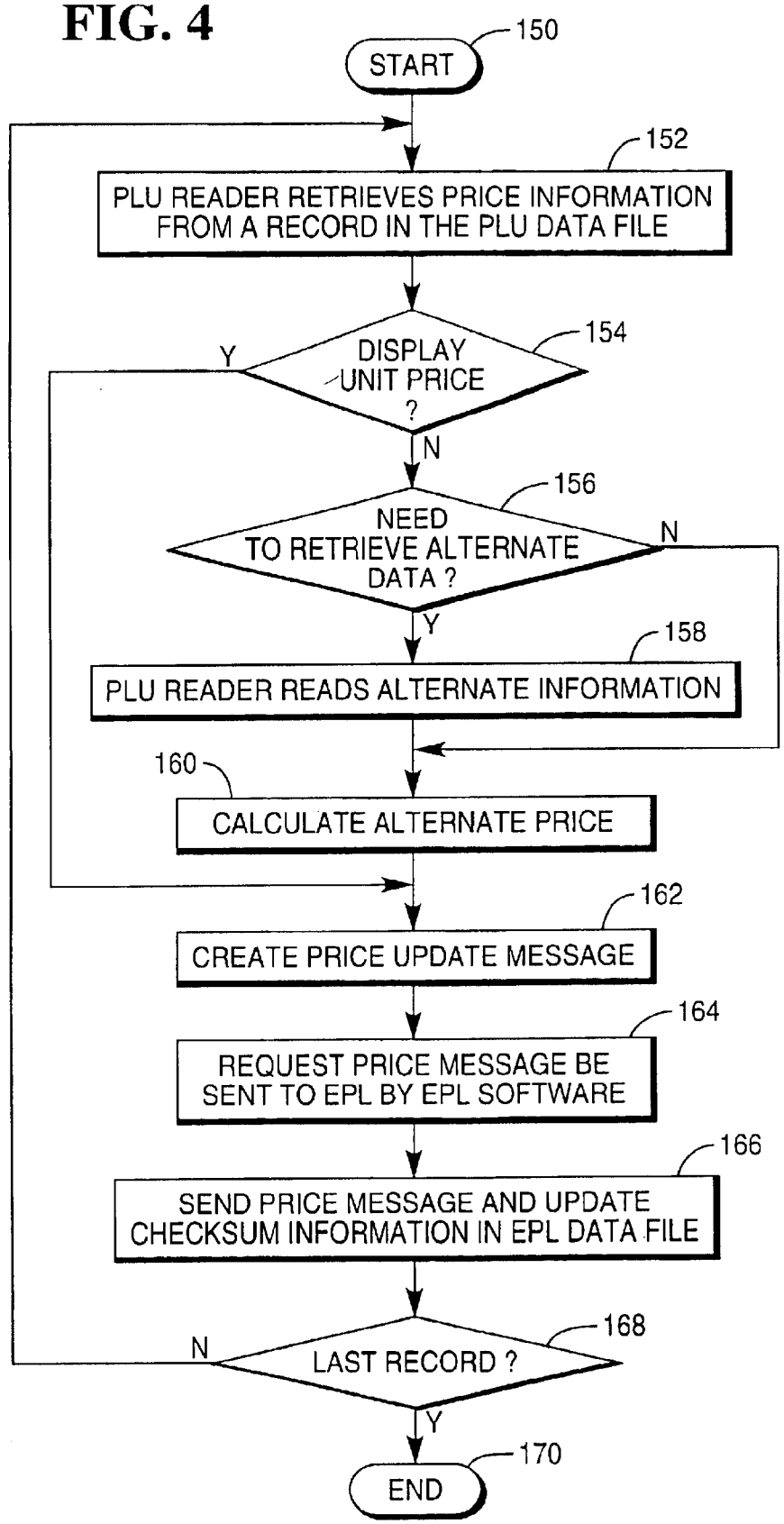

SYSTEM AND METHOD FOR HANDLING ALTERNATE INFORMATION ON ELECTRONIC PRICE LABELS

FIELD OF THE INVENTION

The present invention relates generally to improvements to electronic price label (EPL) systems, and more specifically to systems and methods for handling alternate information by EPLs.

BACKGROUND OF THE INVENTION

EPL systems typically include a plurality of EPLs for merchandise items in a store or transaction establishment. EPLs display the price of corresponding merchandise items on store shelves and are typically attached to a rail along the leading edge of the shelves. A store may contain thousands of EPLs to display the prices of the merchandise items. The EPLs are coupled to a central server where information about the EPLs is typically maintained in an EPL data file. Price information displayed by the EPLs is typically obtained from a price look-up (PLU) file which contains item identification information and item price information.

To keep the cost of EPLs to a minimum, current EPLs often include a limited amount of memory, and typically are used by retailers to display limited information, such as a regular retail price and a price per unit. However, retailers wish to display ever increasing amounts of information other than the regular price and the unit price. Depending on the retail environment, it may be particularly desirable to display alternate information, such as the amount of value added tax (VAT), a "frequent shopper" discounted price, or other promotional information applicable to a certain merchandise item.

Due to the limited memory and display capacity of current EPLs, retailers have attempted to utilize sequential messages. For example, the EPL will display a first message containing regular price and unit price information, followed by a second message containing alternate information, followed by a return to the first message with blinking or flashing or scrolling between the two messages. However, such sequential messaging has several disadvantages. For example, the prospective customer may see the first message and then proceed to another item in the store without seeing the second message and without purchasing the item. Thus, the prospective customer first must recognize that there are sequential messages, and then must be prepared to stand at the display for several seconds in order to receive all the information. In this latter case, the customer's progress through the store is slowed, and customers may become easily frustrated by having to wait.

Sequential messaging suffers from another serious disadvantage, in that the instruction to scroll requires transmission of extra data to the EPL. This transmission consumes bandwidth and requires more communication time than would be required in the absence of the scrolling instruction.

Therefore, it would be desirable to provide methods and apparatus for handling alternate information on EPLs so as to make all necessary information available to the prospective customer at the same time. It also would be desirable to provide methods and apparatus for handling alternate information in an EPL system which conserves system bandwidth.

SUMMARY OF THE INVENTION

In accordance with the teachings of the present invention, improved systems and methods for handling alternate information on electronic price labels (EPLs) are provided.

One system in accordance with the present invention includes a computer, comprising:
 a first data file comprising a record for a merchandise item associated with an electronic price label, the record comprising a first field for the item's regular price and a second field for alternate information, if any, to be displayed by the electronic price label;
 means for reading the record from the first data file;
 means for determining whether the electronic price label is to display the item's unit price or an alternate message corresponding to the alternate information for the item;
 means for transmitting to the electronic price label a message containing the unit price and a command to display the unit price; and
 means for transmitting to the electronic price label an alternate message and a command to display the alternate message.

One computerized method for handling alternate information in accordance with the present invention includes the steps of:
 reading, from a first data file, a record for a merchandise item associated with an electronic price label, the record comprising a first field for the item's regular price and a second field for alternate information, if any, to be displayed by the electronic price label;
 determining whether the electronic price label is to display the item's unit price or an alternate message corresponding to the alternate information for the item;
 if the item's unit price is to be displayed, transmitting a message to the electronic price label, containing the unit price and a command to display the unit price; and
 if the item's unit price is not to be displayed, transmitting to the electronic price label the alternate message and a command to display the alternate message.

In both the above system and method, the alternate message may be determined utilizing a looking table or an algorithm or an instruction to perform a calculation to determine the alternate message.

It is accordingly an object of the present invention to provide a system and method for handling alternate information on EPLs which relies on information stored within an additional field of a PLU file.

It is another object of the present invention to provide a system and method for handling alternate information on EPLs which includes a customized PLU file reader.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 2 is a diagram showing data files used within a transaction establishment in accordance with the present invention;

FIG. 4 is a flow diagram illustrating the operation of a customized PLU file reader in accordance with the present invention.

DETAILED DESCRIPTION

Figure 1:
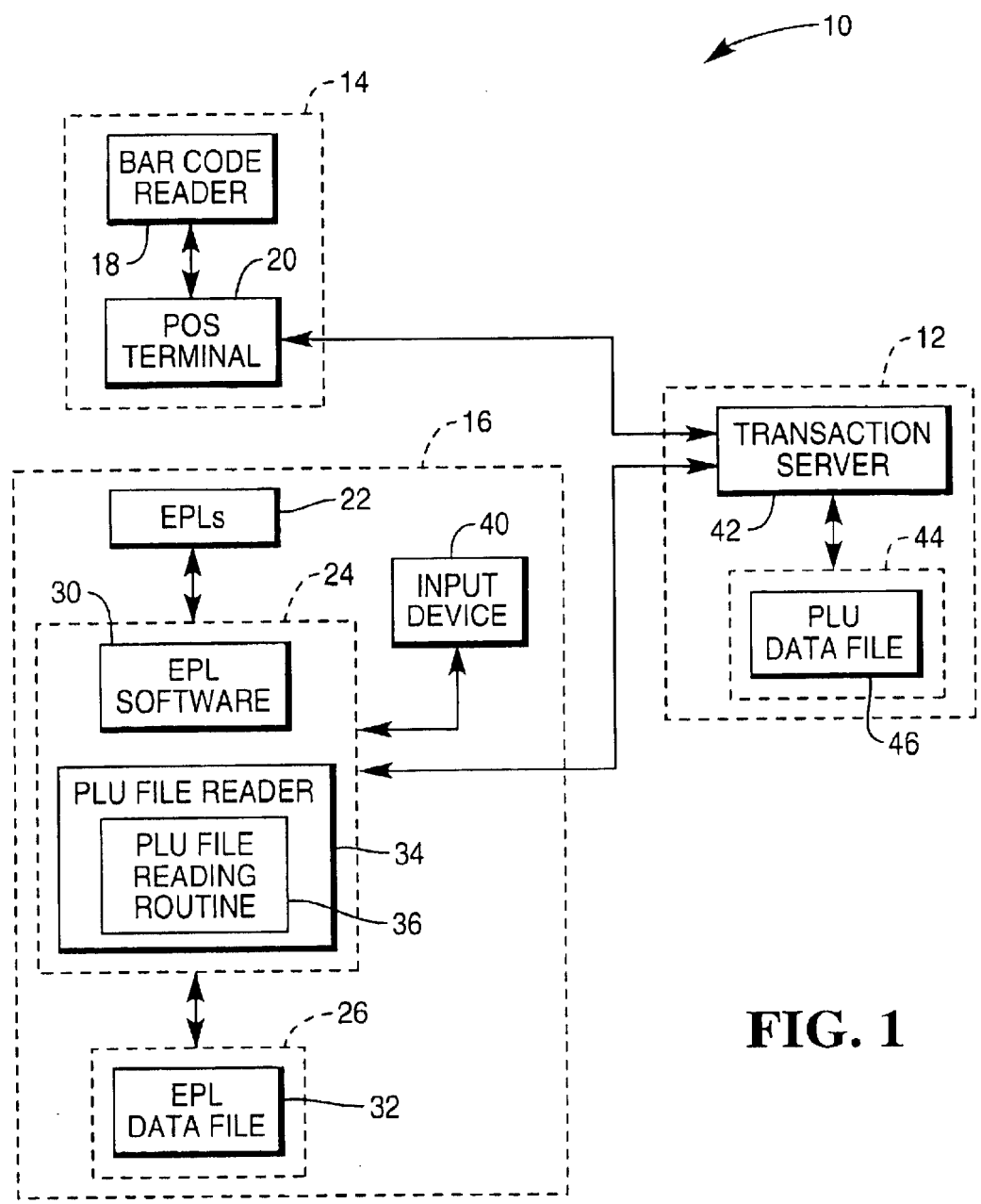
FIG. 1 is a block diagram of a transaction processing system in accordance with the present invention.

Referring now to FIG. 1, transaction system 10 primarily includes host computer system 12, point-of-sale (POS)

system 14, and EPL system 16. Here, components 12, 14, and 16 are shown as separate components that are networked together, but they and their subcomponents may also be combined in various ways. Thus, host computer system 12 may be a POS terminal which doubles as a host computer for a network of other POS terminals.

POS system 14 includes bar code reader 18 and POS terminal 20.

EPL system 16 primarily includes EPLs 22, host EPL computer 24, and EPL storage medium 26.

Host EPL computer 24 executes EPL control software 30 and PLU file reader 34. To assist with execution of certain tasks performed by EPL software 30, EPL computer 24 includes a built-in time keeping device, commonly referred to as a system clock, which is synchronized with current time, in order to automatically execute the tasks at their scheduled times.

EPL software 30 is responsible for scheduling and transmitting price data from EPL data file 32 to EPLs 22. EPL software 30 obtains prices in price look-up (PLU) data file 46 as they are entered in input device 40 (immediate processing) or after they have been stored within PLU data file 46 (batch processing). EPL control software 30 also schedules and transmits alternate data to EPLs 22 when dictated by PLU reader 34.

PLU file reader 34 includes PLU file reading routine 36. In one embodiment of the invention, PLU reader 34 retrieves the price from the Master Price File (usually PLU data file 46) and determines whether the unit price or alternate data needs to be sent to the applicable EPL 22. In a preferred embodiment of the invention, the system operator may choose to display unit price or an alternate message on a system-wide basis. If alternate data is to be sent, PLU file reader 34 calculates the alternate data value. In order to determine the alternate data value, a separate file (other than PLU data file 46) may need to be accessed. For example, to display Value Added Tax (VAT) information, PLU file reader 34 may have to read a VAT table and calculate the amount of VAT based on the price of the item.

EPL storage medium 26 stores EPL data file 32, and is preferably a fixed disk drive. EPL data file 32 contains EPL identification and price checksum information. Price checksum information is calculated from price information in PLU data file 46. EPL data file 32 contains current information displayed by EPLs 22.

Input device 40 is preferably a keyboard, but could be a touchscreen or other suitable device for a desired input.

Host computer system 12 includes PLU storage medium 44 and transaction server 42.

Transaction server 42 handles price requests from POS terminal 20. POS terminal 20 sends item identification information to transaction server 42, and transaction server 42 returns the corresponding price from PLU data file 46.

PLU storage medium 44 stores PLU data file 46. PLU data file 46 is available for distribution to POS terminal 20. Alternatively, provision may be made for direct access to PLU data file 46 by bar code reader or scanner 18.

Turning to FIG. 2, EPLs 22, EPL data file 32 and PLU data file 46 are shown in further detail.

Each EPL 22 includes data register 60 and display 23. Data register 60 contains data, usually price data, sent from host EPL computer 24 as directed by EPL control software 30. The data typically are displayed by display 23.

EPL data file 32 includes a line entry for each EPL 22 in EPL system 16. Each line entry has an item identification entry (ITEM ID), an EPL identification entry (EPL ID), and an EPL price checksum value entry (EPL CHECK).

Entry ITEM ID identifies a store item. Entry EPL ID identifies which EPL is assigned to the item. Entry EPL CHECK is a checksum value of the digits of the price information that is displayed by display 23.

PLU data file 46 includes a line entry for each item sold in the store. Each line entry has a store item identification entry (ITEM ID) and a PLU price entry (PLU PRICE). Entry PLU PRICE identifies the price read by POS system 14 to determine the price of each item during scanning by bar code reader 18. Some line entries in PLU data file 46 may also include alternate information to be displayed in lieu of the item's unit price (entry ALTERNATE DATA).

During normal operation, PLU file reader 34 reads price information from PLU data file 46, and EPL control software 30 sends the price to data register 60. Display 23 displays the price in data register 60. In one embodiment of the present invention, PLU file reader 34 reads PLU data file 46 to determine the presence or absence of alternate data in the record corresponding to each merchandise item. For each item whose record does not contain alternate data, the corresponding EPL should display the item's unit price, determined routinely by a calculation involving the price multiple, if any (for example, three items for one dollar), the package size and a conversion factor or "measurement" field. For each item whose record does contain alternate data, PLU reader 34 reads the alternate data and causes EPL control software 30 to schedule and transmit the alternate message to the associated EPLs for display, so as to supersede any display of unit price.

In a preferred embodiment of the invention, the system operator may choose to display unit price or an alternate message on a system-wide basis. That is, all EPLs in the system will display unit price or, instead, will display an alternate message. The operator can make this choice by setting a parameter or by coding PLU reader 34 to specifically look for alternate data for all merchandise items. If PLU reader 34 looks for alternate data, but there is none in entry ALTERNATE DATA for a particular merchandise item, the corresponding EPL displays a blank in lieu of the item's unit price.

The alternate message may be a "wholesaler" price or a frequent shopper price or an instruction to calculate the frequent shopper price, for example, by determining an amount of discount for the frequent shopper and subtracting this amount from the retail price, or by multiplying the retail price by an "after discount" percentage. The alternate message may instead be VAT or an instruction to calculate VAT, for example, by setting the package size to "1" and entering in the VAT percentage rate in the measurement field. Further, the alternate message may instead be promotional information such as a price multiple such as "3 for a dollar", "BOGO" (buy one, get one free) or the like.

It should be noted that the present invention further contemplates the use of overlays such as paper labels suitably attached to the front of certain EPLs. For example, in the case of a frequent shopper alternate message, the overlay would indicate which price is the frequent shopper price and which is the normal retail price. In the case of a VAT alternate message, the overlay might indicate which price is the full retail price (item cost+VAT) and which is the price before adding VAT.

Figure 3A:
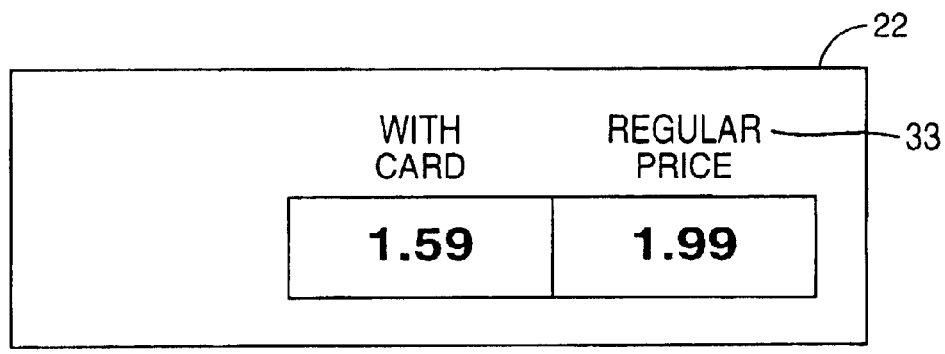
FIGS. 3A and 3B each contain a diagram of the front face of an EPL which is displaying an alternate message in accordance with the present invention.
Figure 3B:
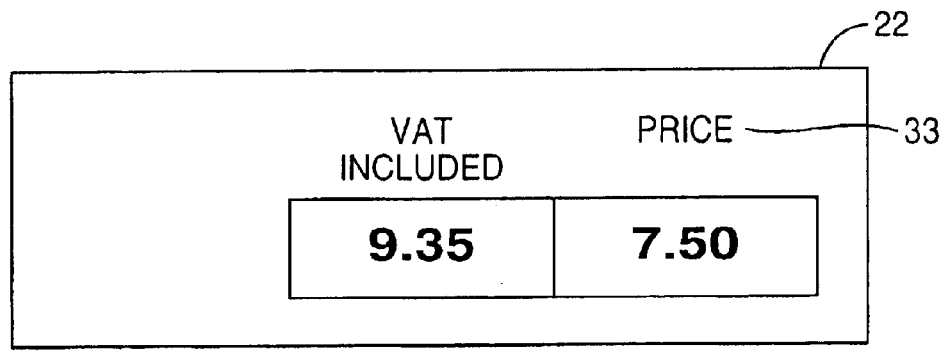

Turning now to FIG. 3, the display of an EPL 22 is depicted in accordance with the present invention, wherein an alternate message appears in the display field normally occupied by the unit price. In FIG. 3A, the alternate message is for a frequent shopper price. Optional paper overlay 33 indicates that the price shown in one display field is the "Regular Price," and the price shown in the other display field is the discount price available with a "frequent shopper card." In FIG. 3B, the alternate message relates to VAT. Optional paper overlay 33 indicates that the price shown in one display field is the regular "Price," and the price shown in the other display field is the price with "VAT included."

Turning now to FIG. 4, a method of displaying alternate messages by EPLs 22 begins with a start step 150. In step 152, PLU file reader 34 reads the record for a merchandise item in PLU data file 46.

In step 154, PLU reader 34 determines whether the unit price is to be displayed for the applicable merchandise item. The unit price is to be displayed, for example, when the field for ALTERNATE DATA is empty in the applicable record in PLU data file 46. Alternatively, as discussed above, the operator has chosen to display unit price on a system-wide basis. If the unit price is to be displayed, operation proceeds directly to step 162. If the unit price is not to be displayed (because, for example, alternate data are present in the applicable record in PLU data file 46 or the operator has chosen to display alternate messages on a system-wide basis), operation proceeds to step 156. In one embodiment of the invention, the alternate data may be an algorithm or instruction to perform a calculation, such as determination of a frequent shopper price or value added tax (VAT).

In step 156, PLU reader 34 determines whether additional information needs to be retrieved, for example, from a separate file, in order to calculate the alternate information to be displayed in lieu of the unit price. If no additional information needs to be retrieved, operation proceeds directly to step 160. If additional information does need to be retrieved, operation proceeds to step 158.

In step 158, PLU reader 34 reads the additional information needed to generate or calculate the desired alternate message. As discussed above, a separate file (other than PLU data file 46) may need to be read to obtain this additional information.

In step 160, PLU reader 34 calculates the desired alternate price.

In step 162, PLU reader 34 creates a "price update" message. If no alternate data were present in the applicable record in PLU data file 46, the "price update" message to be displayed is a blank.

In step 164, PLU reader 34 sends the price update message to EPL control software 30, to be transmitted to the applicable EPL 22.

In step 166, EPL software 30 transmits the price update message to the applicable EPL 22, with a command to display the message. EPL software 30 also updates EPL data file 32 with the information transmitted to, and now being displayed by, target EPL 22.

In step 168, PLU reader 34 determines whether the record that it most recently read from PLU data file 46 is the last record. If not, operation returns to step 152. If so, operation ends at step 170.

Although the present invention has been described with particular reference to certain preferred embodiments thereof, variations and modifications of the present invention can be effected within the spirit and scope of the following claims. By way of example, while alternate messages such as a frequent shopper price, other promotional information, or VAT have been specifically disclosed, it will be recognized that other alternate messages, such as the price in another currency or the like, may be displayed utilizing the present invention.

We claim:

1. A computerized method for displaying alternate information on an electronic price label comprising the steps of:

(a) reading, from a first data file, a record for a merchandise item associated with an electronic price label, the record comprising a first field for the item's regular price and a second field for alternate data;

(b) determining whether the electronic price label is to display the item's unit price or an alternate message based on the alternate data for the item;

(c) if the item's unit price is to be displayed, transmitting a message to the electronic price label, containing the unit price and a command to display the unit price;

(d) if the item's unit price is not to be displayed, determining if the alternate data comprises the alternate message or the alternate data comprises one or more instructions directing the creation of the alternate message;

(e) if the alternate data comprises the alternate message, transmitting to the electronic price label the alternate message and a command to display the alternate message; and (f) if the alternate data comprises one or more instructions directing the creation of the alternate message, creating the alternate message utilizing the one or more instructions and transmitting to the electronic price label the alternate message and the command to display the alternate message.

2. The method of claim 1 wherein step (b) comprises determining the presence or absence of alternate data in the second field of the record.

3. The method of claim 1 wherein the alternate data comprises a frequent shopper discounted price, a value added tax amount or other promotional information.

4. The method of claim 2 wherein the alternate data comprise an instruction for calculating a frequent shopper price.

5. The method of claim 1 wherein the first data file is a price look-up file.

6. The method of claim 2, further comprising reading, from a record in a second data file, additional information needed to generate or calculate the alternate message.

7. The method of claim 6, further comprising:

(g) updating a record in a third data file with the transmitted alternate message.

8. The method of claim 7, wherein the third data file is an electronic price label data file.

9. A computerized system for handling alternate information on electronic price labels comprising:

a first data file comprising a record for a merchandise item associated with an electronic price label, the record comprising a first field for the item's regular price and a second field for alternate data;

means for reading the record from the first data file;

means for determining whether the electronic price label is to display the item's unit price or an alternate message based on the alternate data for the item;

means for transmitting to the electronic price label a message containing the unit price and a command to display the unit price;

means for determining if the alternate data comprises the alternate message or the alternate data comprises one or more instructions directing the creation of the alternate message;

means for creating the alternate message utilizing the one or more instructions if the alternate data comprises the one or more instructions; and means for transmitting to the electronic price label the alternate message and a command to display the alternate message.

10. The system of claim 9 wherein the means for reading comprises a price look-up file reader.

11. The system of claim 9 wherein the means for determining comprises means for determining the presence or absence of alternate data in the second field of the record.

12. The system of claim 9 wherein the alternate data comprises a frequent shopper discounted price, a value added tax amount or other promotional information.

13. The system of claim 11 wherein the alternate data comprise an to calculate a frequent shopper price.

14. The system of claim 9 wherein the first data file is a price look-up file.

15. The system of claim 11, further comprising means for reading, from a record in a second data file, additional information needed to generate or calculate the desired alternate message.

16. The system of claim 15, further comprising means for updating a record in a third data file with the alternate message transmitted to the electronic price label.

17. The system of claim 16, wherein the third data file is an electronic price label data file.

* * * * *